F. N. LAMBERT.
SPEED MEASURE.
APPLICATION FILED MAY 7, 1914.
1,110,698.
Patented Sept. 15, 1914.
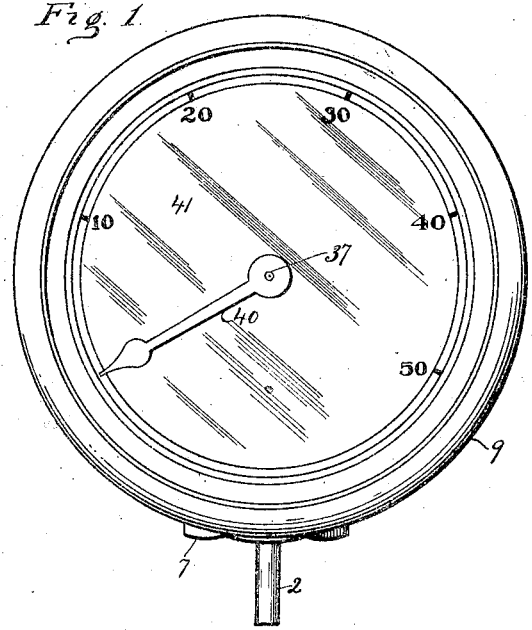
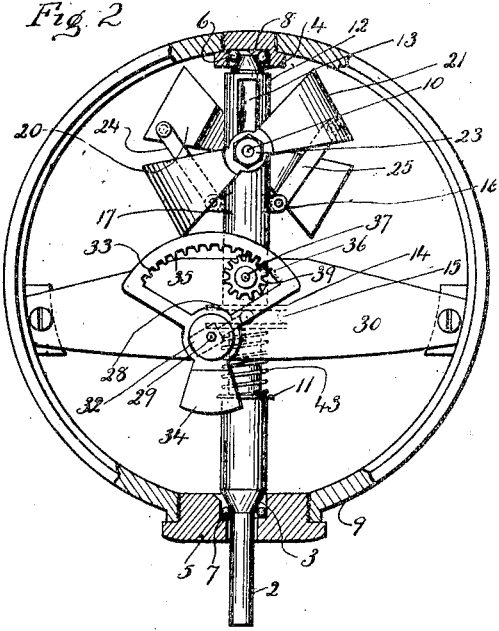
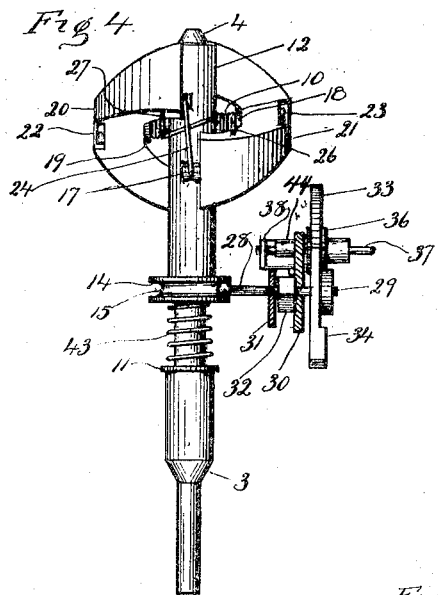
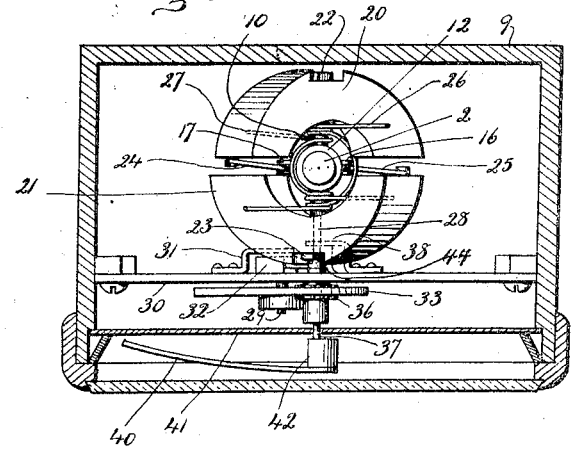
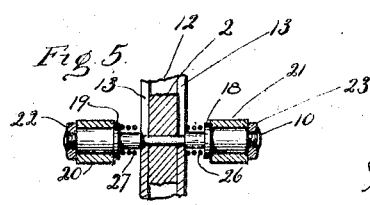
Witnesses
C. L. Weed
M. P. Nichols
Inventor
Francis N. Lambert
by Seymour & Earle
Atty

UNITED STATES PATENT OFFICE.

FRANCIS N. LAMBERT, OF NEW BRITAIN, CONNECTICUT.

SPEED-MEASURE.

1,110,698.　　　　Specification of Letters Patent.　　Patented Sept. 15, 1914.

Application filed May 7, 1914.　Serial No. 836,928.

*To all whom it may concern:*

Be it known that I, FRANCIS N. LAMBERT, a citizen of the United States, residing at New Britain, in the county of Hartford and State of Connecticut, have invented a new and useful Improvement in Speed-Measures; and I do hereby declare the following, when taken in connection with the accompanying drawings and the characters of reference marked thereon, to be a full, clear and exact description of the same, and which said drawings constitute part of this application, and represent, in—

Figure 1 a front view of a speed measure constructed in accordance with my invention. Fig. 2 a front view partially in section of the same with the dial and pointer removed. Fig. 3 a top view with the case in section. Fig. 4 a side view of the governor mechanism omitting the case. Fig. 5 a broken sectional view illustrating the manner of mounting the governor heads on the transverse arm.

This invention relates to an improvement in speed measures such as commonly used on motor vehicles to indicate the speed at which the vehicle is traveling, and particularly relates to speed measures of the centrifugal governor type.

The object of this invention is to construct a speed measure in which the parts are so counterbalanced as to improve the accuracy of the indication, and the invention consists in the construction hereinafter described and particularly recited in the claims.

In carrying out my invention I employ a shaft 2 which is driven in the usual way, generally by a flexible shaft in connection with the front wheels of a vehicle. This shaft is provided with conical bearings 3 and 4 resting on balls 5 and 6 in seats 7 and 8, these seats being secured in any suitable casing 9 generally adapted to be attached to the dashboard of a vehicle and so that the shaft stands in a vertical position. Fixed to the shaft is a transverse rod 10 and the rod is provided with a shoulder 11 which may be in the form of a washer permanently fixed to the shaft. On the shaft is a sleeve 12 formed on opposite sides with clearance slots 13 for the rod 10 and at the lower end of the sleeve is a double collar 14 forming a channel 15 for the purpose as will hereinafter appear. On opposite sides of the sleeve and at right angles to the slots 13 are outwardly projecting ears 16 and 17. On the ends of the shafts are bushings 18 and 19, and mounted on the bushings are governor heads 20 and 21, these heads being secured in place by nuts 22 and 23 turned on to the threaded ends of the rod 10 the ends of which are preferably upset so as to prevent the removal of the nuts. The head 20 is connected with the ears 17 by a link 24, and the head 21 connected with the ears 16 by a link 25. It may here be stated that these heads are duplicates of each other, and the opposite ends of each are wedge shaped. A wire spring 26 has a bearing at one end on the upper face of the head 20, is turned around the bearing 19, curved around the sleeve 12, then around the bearing 18 into engagement with the upper face of one end of the head 21. Another wire spring 27 has a bearing on the under face of the opposite end of the head 20, is coiled about the bearings 18 and 19, and has a bearing on the under face of the opposite end of the head 21. These wire springs are preferably formed from different sizes of wires so as to exert different degrees of resistance.

In connection with the mechanism described, I employ a ball-finger 28 fixed to a rock shaft 29 extending through a plate 30 by which it is supported in connection with a bracket 31, and this ball-finger is counterbalanced by a block 32 in which the finger is mounted. The use of a ball-finger minimizes friction. On the outer end of the rock shaft 29 a segmental rack 33 is fixed, and this is counterbalanced by a downwardly projecting weight 34. The teeth 35 of the rack mesh with a pinion 36 fixed to a pointer shaft 37 which has a bearing in the plate 30 and a bracket 38, and is held in position by a collar 44 between the plate 30 and bracket 38. This pinion is preferably provided with a stop tooth 39 which will engage with a segment at each end of the series of teeth 35. On the pointer shaft 37 is a pointer 40 adapted to sweep the usual dial 41 and the hub 42 on the pointer is eccentric so that the pointer is counterbalanced.

It will thus be seen that the several parts of my improved device are all balanced. On the shaft below the sleeve is a coil spring 43 which tends to raise the sleeve to its normal or zero position, and this spring will compensate for low speeds, say for instance, up to three miles an hour. The spring 26 will regulate from three to thirty, for instance, and the two springs 26 and 27 will both come into play in the higher speeds. As the speed of the vehicle increases the rotation of the shaft causes the governor heads to straighten out, so to speak, or approach a horizontal position, and in thus approaching a horizontal position the sleeve is moved downward, and this sleeve engaging with the arm 28 will turn the rack 33 so as to move the pointer and indicate the speed at which the vehicle is traveling. As the speed decreases the governor heads assume an inclined position, allowing the sleeve to rise so as to turn the pointer backward toward the zero point.

I claim:—

1. A speed measure comprising a rotatable shaft, a sleeve slidably mounted on said shaft to turn therewith, a rod carried by the shaft, a pair of reversely inclined governor heads mounted on said rod, said heads each connected with said sleeve, an indicator pointer, and connections between the pointer and sleeve whereby the movement of the sleeve will turn the pointer.

2. A speed indicator comprising a vertically arranged rotatable shaft, a sleeve mounted on said shaft and formed on opposite sides with slots, a transverse rod fixed to said shaft and projecting outward through said slots, reversely inclined governor heads mounted on opposite ends of said rod, said governor heads each wedge shaped and each connected with said sleeve, springs bearing at opposite ends on opposite heads, an indicating pointer, and connections between the sleeve and pointer whereby the pointer will be moved with the sleeve.

3. A speed measure comprising a vertically arranged shaft, said shaft provided with a shoulder, a sleeve mounted on said shaft and formed near its upper end on opposite sides with slots, a rod fixed to said shaft and projecting through said slots, a governor head fixed to each end of said rod, links connecting each of the heads with the said sleeve, a spring between the shoulder on the shaft and the lower end of the sleeve, said sleeve formed with a groove, a counterbalanced finger extending into said groove, a segmental rack connected with said finger and moved therewith, a pinion adapted to be moved by said rack, and a pointer moved by said pinion.

4. A speed measure comprising a vertically arranged shaft, said shaft provided with a shoulder, a sleeve slidably mounted on said shaft to turn therewith, a rod fixed to said shaft, a governor head fixed to each end of said rod, links connecting each of the heads with the said sleeve, a spring between the shoulder on the shaft and the lower end of the sleeve, said sleeve formed with a groove, a counterbalanced finger extending into said groove, a counterbalanced segmental rack connected with said finger and moved therewith, a pinion adapted to be moved by said rack, and a pointer moved by said pinion.

5. A speed measure comprising a vertically arranged shaft, said shaft provided with a shoulder, a sleeve slidably mounted on said shaft to turn therewith, a rod fixed to said shaft, a governor head fixed to each end of said rod, links connecting each of the heads with the said sleeve, a spring between the shoulder on the shaft and the lower end of the sleeve, said sleeve formed with a groove, a counterbalanced finger extending into said groove, a counterbalanced segmental rack connected with said finger and moved therewith, a pinion adapted to be moved by said rack, and a counterbalanced pointer moved by said pinion.

In testimony whereof, I have signed this specification in the presence of two subscribing witnesses.

FRANCIS N. LAMBERT.

Witnesses:
M. P. NICHOLS,
GEO. D. SEYMOUR,

---

Copies of this patent may be obtained for five cents each, by addressing the "Commissioner of Patents, Washington, D. C."